(12) United States Patent
Dongaonkar et al.

(10) Patent No.: US 11,868,769 B1
(45) Date of Patent: Jan. 9, 2024

(54) AUTOMATICALLY DETERMINING AND MODIFYING ENVIRONMENTS FOR RUNNING MICROSERVICES IN A PERFORMANT AND COST-EFFECTIVE MANNER

(71) Applicant: Pangea Cyber Corporation, Inc., Palo Alto, CA (US)

(72) Inventors: Akshay Dongaonkar, Palo Alto, CA (US); Prashant Pathak, Palo Alto, CA (US); Sourabh Satish, Palo Alto, CA (US)

(73) Assignee: PANGEA CYBER CORPORATION, INC., Palo Alto, CA (US)

( * ) Notice: Subject to any disclaimer, the term of this patent is extended or adjusted under 35 U.S.C. 154(b) by 0 days.

(21) Appl. No.: 17/874,285

(22) Filed: Jul. 27, 2022

(51) Int. Cl.
  *G06F 9/50* (2006.01)
  *G06F 9/22* (2006.01)
  *G06F 9/54* (2006.01)
  *G06F 9/445* (2018.01)

(52) U.S. Cl.
  CPC .......... *G06F 9/226* (2013.01); *G06F 9/44505* (2013.01); *G06F 9/5027* (2013.01); *G06F 9/5072* (2013.01); *G06F 9/541* (2013.01); *G06F 9/5077* (2013.01)

(58) Field of Classification Search
  CPC .... G06F 9/226; G06F 9/44505; G06F 9/5027; G06F 9/5072; G06F 9/541; G06F 9/5077
  See application file for complete search history.

(56) References Cited

U.S. PATENT DOCUMENTS

| | | | | |
|---|---|---|---|---|
| 9,940,111 | B2* | 4/2018 | Labocki | H04L 67/562 |
| 2015/0199197 | A1* | 7/2015 | Maes | G06F 8/65 |
| | | | | 717/122 |
| 2018/0124194 | A1* | 5/2018 | Rajewski | H04L 67/53 |
| 2021/0232438 | A1* | 7/2021 | Opsenica | G06F 9/45558 |
| 2022/0188164 | A1* | 6/2022 | Gerö | G06F 9/5077 |
| 2023/0020330 | A1* | 1/2023 | Schwerin | G06F 16/256 |

OTHER PUBLICATIONS

Puliafito et al.; Stateless or Stateful FaaS? I'll Take Both!; IEEE; Jun. 2022 (Year: 2022).*

* cited by examiner

*Primary Examiner* — Corey S Faherty
(74) *Attorney, Agent, or Firm* — Brill Law Office; Jeffrey Brill (57) ABSTRACT

Deployments of microservices executing in a cloud are automatically managed. Some microservices are deployed on dedicated nodes, others in serverless configurations. Rates of invocation and runtime data of microservices are monitored. Responsive to the monitored rate of invocation of a microservice running serverless exceeding a given threshold, the microservice is automatically redeployed to a dedicated node. A microservice executing on a dedicated node may be redeployed serverless if the infrequency with which it is called is sufficient. Microservices can be automatically redeployed between different dedicated nodes with different capacities based on monitored usage. The underlying cloud service provider may be automatically monitored for changes in serverless support functionality. Responsive to these changes, the thresholds at which microservices are redeployed can be automatically adjusted. Microservices may also be redeployed, and thresholds adjusted, in response to serverless microservice failures resulting from insufficient support provided by the underlying cloud service provider.

26 Claims, 4 Drawing Sheets

AUTOMATICALLY DETERMINING AND MODIFYING ENVIRONMENTS FOR RUNNING MICROSERVICES IN A PERFORMANT AND COST-EFFECTIVE MANNER

TECHNICAL FIELD

This disclosure pertains generally to cloud computing and microservice architectures, and more specifically to automatically determining and modifying environments for running microservices in a performant and cost-effective manner.

BACKGROUND

Cloud computing is a widely used model today. There are a number of cloud providers, such as Amazon Web Services (AWS), Google Cloud Platform (GCP), Microsoft Azure (Azure) and Oracle Cloud. These cloud platforms provide cloud-based resources such as computing power, storage, and content delivery services to organizations. By using a cloud provider, an organization's application code can be run in the cloud, and called via an Application Program Interface (API), without the organization needing to maintain its own cloud infrastructure.

Contemporary cloud-based applications are frequently built using a microservices architecture, in which an application is divided into smaller separate units, each executing as a separate process and performing a specific functionality. Microservices are loosely coupled, independently deployable units of code. To serve a single user request, a microservices-based architecture may call many separate microservices. It is highly desirable to run each instance of each microservice in isolation, and for this purpose containers are typically used. A typical microservice architecture may utilize many container instances across multiple machines. A container orchestration platform is a tool used to manage these multiple containers. Kubernetes (K8s) is a widely used container orchestration tool, although there are others such as Nomad, Docker Swarm, and DC/OS.

Application code such as that for a microservice can be executed on a dedicated node, making the corresponding service available 24×7. Cloud providers also provide tools that support the serverless running of application code (e.g., AWS has Lambdas, GCP has CloudRun, Azure has Cosmos, etc.). With serverless code execution, rather than keeping a node and its associated resources up and running so that the corresponding service is always available, the cloud provider automatically starts the associated computing infrastructure when the code is called, executes the code, and then terminates the infrastructure after the code terminates. It is to be understood that in this context the term "serverless" does not mean that there are no servers involved in the underlying infrastructure provided by the cloud provider. However, cloud-based applications that deploy microservices to execute serverless are isolated from the underlying infrastructure with these serverless deployments, and do not need to configure, maintain, manage or take into account the underlying physical or virtual machines on which the code is run. Instead, the code for the service is simply packaged-up and deployed via the cloud provider serverless tool (e.g., AWS Lambda, GCP has CloudRun, etc.). When the service is called, the cloud provider takes care of spinning up the infrastructure on which to execute the code and then taking it down after the code executes, all without the involvement of the associated cloud-based application (or its developers).

For code that tends to be executed infrequently, a serverless configuration can be advantageous over keeping a node running all the time. This is so because a serverless configuration only requires paying for the computing resources that are actually used for the execution, as opposed to keeping a dedicated node operational 24×7 in case the code is called. On the other hand, there is an overhead associated with each serverless execution of application code. Each time the code is called, the infrastructure for running the code needs to be implemented, and then taken down after the code runs. For application code that is called frequently, it is inefficient to go through this process each time the code is called. In fact, for services that are called more frequently, running serverless may not only be more expensive, but may also cause performance issues, since there is a cost and overhead to, e.g., starting a container and then tearing down the container each time the service is called. Additionally, the serverless capabilities provided by cloud providers typically have various kinds of limits. For example, in the case of AWS Lambda, a unit of serverless code cannot run for more than fifteen minutes, after which the runtime is interrupted and terminated. Other limitations for running serverless code are also imposed by AWS Lambda and the other providers, such as limits on the number of concurrent executions, quotas on storage and memory use, etc.

Conventionally, third parties using cloud providers decide to run each separate microservice of the application either on a dedicated node with 24×7 availability or serverless, depending upon the frequency with which it is anticipated that the service will be called, as well as the resource requirements of the service. However, as an application matures and grows over time, there may be new capabilities added to various units of code. A microservice that was expected to be called very infrequently may be executed much more frequently than was anticipated, and vice versa. In addition, as the application matures, different services may use more, less and/or different resources. As the characteristics of the serverless code change, the cost of running the code serverless may increase, or even worse cause functional errors if needed capabilities are not available for serverless execution. It is also the case that a service deployed on a dedicated node may be called less than anticipated over time, and/or use fewer resources, in which case maintaining the dedicated node is wasteful.

It would be desirable to address these issues.

SUMMARY

A microservice deployment management system automatically manages the deployments of multiple microservices executing in a cloud. These microservices may be associated with one or multiple cloud-based applications. Some microservices may be deployed on dedicated nodes (for example as K8s service), whereas others may be deployed in serverless configurations (for example using AWS Lambda). The rates of invocation and corresponding runtime data of the various microservices are monitored over periods of time (for example by a metering microservice as described in more detail below). In response to the monitored rate of invocation of a microservice running serverless exceeding a given threshold, the microservice may be automatically redeployed to a dedicated node. For example, if a microservice deployed in a serverless configuration is called more frequently than a given threshold, that microservice can be automatically redeployed to a dedicated node. Likewise, a microservice executing on a dedicated node may be redeployed serverless if the infrequency with which it is called is sufficient. Microservices can also be automatically redeployed between different dedicated nodes with different capacities based on monitored usage. The thresholds at which to redeploy microservices are variable design parameters. The monitoring of invocation frequency and corresponding resource usage can be at any level of granularity as desired.

The underlying cloud service provider may also be automatically monitored for changes in serverless support functionality (e.g., changes to the length of time code is able to execute serverless, other changes to resource provision for serverless code execution by the cloud serverless provider, changes to the cost of serverless support functionality, etc.). In response to these changes, the thresholds at which microservices are redeployed can be automatically adjusted as desired. Microservices may also be redeployed, and thresholds adjusted, in response to serverless microservice failures resulting from insufficient serverless support being provided by the underlying cloud service provider.

The features and advantages described in this summary and in the following detailed description are not all-inclusive, and particularly, many additional features and advantages may be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various implementations for purposes of illustration only. One skilled in the art will readily recognize from the following discussion that other implementations of the structures and methods illustrated herein may be employed without departing from the principles described herein.

DETAILED DESCRIPTION

A microservice deployment management system automatically manages the deployments of multiple microservices executing in a cloud. These microservices may be associated with one or multiple cloud-based applications. Some microservices may be deployed on dedicated nodes (for example, as K8s services), whereas others may be deployed in serverless configurations (for example using AWS Lambda). The rates of invocation and corresponding runtime data of the various microservices are monitored over periods of time (for example by a metering microservice as described in more detail below). In response to the monitored rate of invocation of a microservice running serverless exceeding a given threshold, the microservice may be automatically redeployed to a dedicated node. For example, if a microservice deployed in a serverless configuration is called more frequently than a given threshold, that microservice can be automatically redeployed to a dedicated node. Likewise, a microservice executing on a dedicated node may be redeployed serverless if the infrequency with which it is called is sufficient. Microservices can also be automatically redeployed between different dedicated nodes with different capacities based on monitored usage. The thresholds 205 at which to redeploy microservices are variable design parameters. The monitoring of invocation frequency and corresponding resource usage can be at any level of granularity as desired.

The underlying cloud service provider may also be automatically monitored for changes in serverless support functionality (e.g., changes to the length of time code is able to execute serverless, other changes to resource provision for serverless code execution by the cloud serverless provider, changes to the cost of serverless support functionality, etc.). In response to these changes, the thresholds 205 at which microservices are redeployed can be automatically adjusted as desired. Microservices 107 may also be redeployed, and thresholds 205 adjusted, in response to serverless microservice failures resulting from insufficient serverless support being provided by the underlying cloud service provider.

Figure 1:
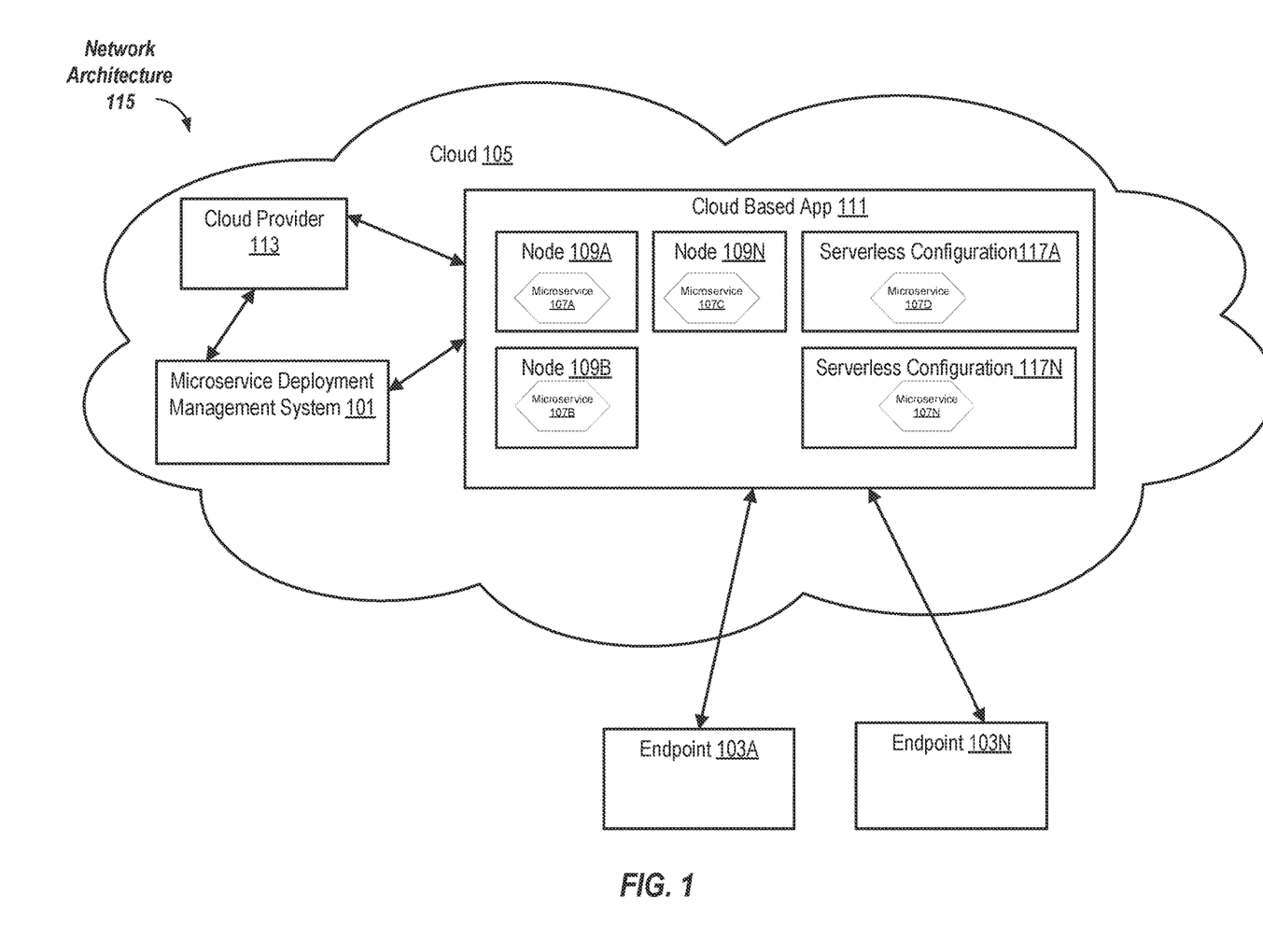
FIG. 1 illustrates a network environment in which a microservice deployment management system can operate, according to some implementations.

FIG. 1 is a block diagram illustrating a high-level overview of an exemplary network architecture 115 in which a microservice deployment management system 101 can be implemented. A cloud-based application 111 runs in the cloud 105, and is comprised of a plurality of microservices 107. Although only a single cloud-based application 111 is shown for clarity of illustration, it is to be understood that in practice individual microservices 107 may be utilized in conjunction with multiple cloud-based applications 111. In addition, although only five microservices 107A-N are shown for clarity of illustration, in practice many more microservices 107 would typically be deployed. Microservices 107A-C are illustrated as executing on dedicated nodes 109, and microservices 107 D-N are illustrated as executing on serverless configurations 117.

The microservice deployment management system 101 and a cloud provider 113 are also illustrated in FIG. 1. As described in more detail below, the microservice deployment management system 101 can itself be instantiated partially or wholly as a plurality of microservices 107. The cloud provider 113 may be in the form of any commercial cloud provider such as Amazon Web Services (AWS), Google Cloud Platform (GCP), Microsoft Azure (Azure), etc. As described in more detail below, the microservice deployment management system 101 is agnostic to the particular cloud provider 113 that is used. Both the cloud-based application 111 and the microservice deployment management system 101 may utilize capabilities of the cloud provider. It is to be understood that the cloud-based application 111, its corresponding microservices 107 and/or the microservice deployment management system 101 may be distributed across multiple containers on multiple physical and/or virtual machines in the cloud 105 as desired.

Endpoint computing devices 103A and 103N (together may be referred to as "endpoint 103") are communicatively coupled to a network 115, for example via a network interface 248 as described below in conjunction with FIG. 4. The endpoint computing devices 103 can be in the form of computing devices operated by users. A user of an endpoint computing device 103 can interact with the cloud-based application 111, for example by utilizing the services it provides. Endpoints 103 are able to access the cloud-based application 111 over the network 115 via, for example, a web browser or other client software (not shown). Endpoint computing devices 103 can be in the form of laptops, desktops and/or other types of computers/computing devices such as portable computer systems capable of connecting to a network 115 and running applications (e.g., smartphones, tablet computers, wearable computing devices, etc.). It is to be understood that other cloud-based applications 111 (not shown) are also able to access the cloud-based application 111, for example by utilizing the services it provides. In one implementation, the network 115 is in the form of the Internet. Other networks 115 or network-based environments can be used in other implementations.

Figure 2:
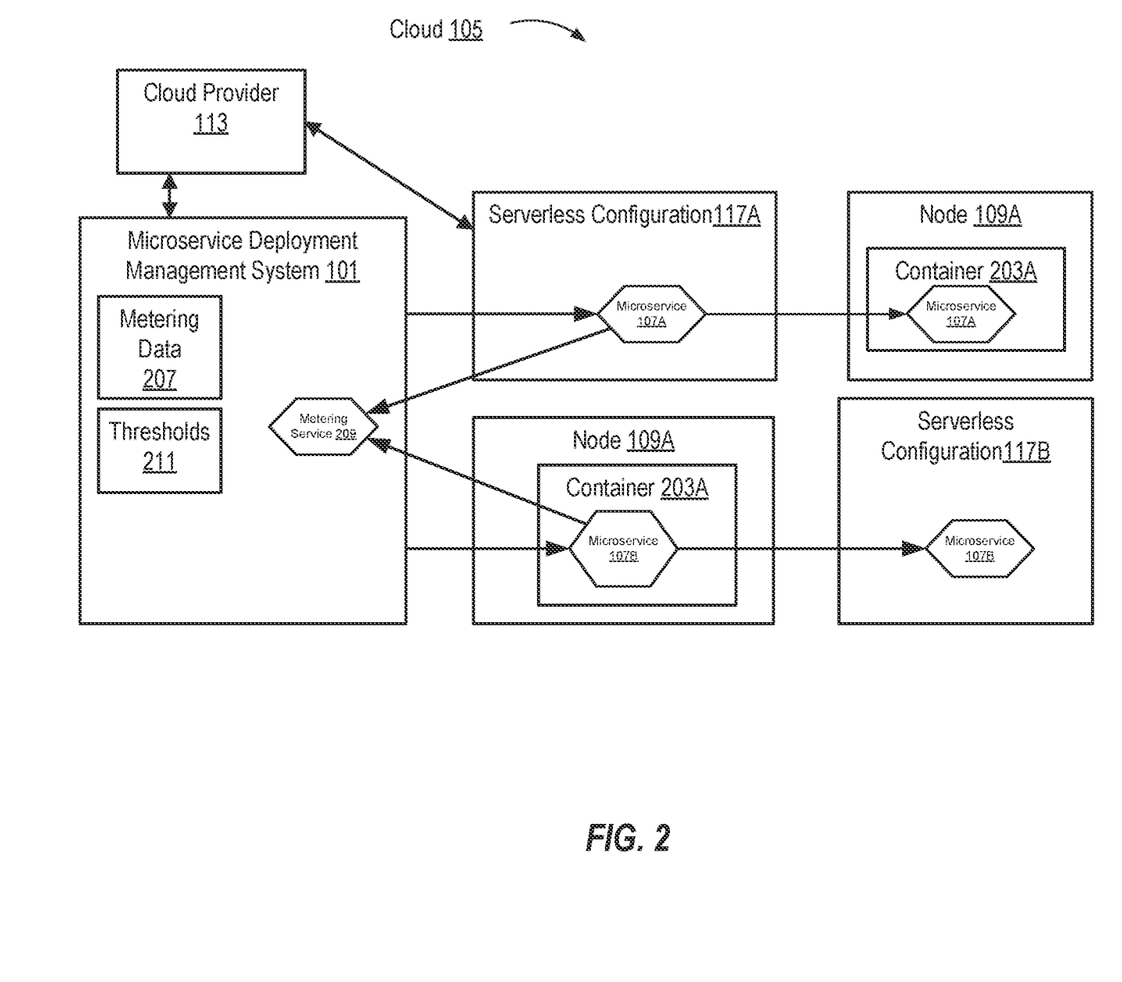
FIG. 2 illustrates the operation of a microservice deployment management system, according to some implementations.

FIG. 2 illustrates the operation of a microservice deployment management system 101. The functionalities of the microservice deployment management system 101 can reside on one or more physical computer systems and/or virtual machines and/or containers, including within a cloud-based computing environment in which the functionality of the microservice deployment management system 101 is provided as a cloud-based service over a network 115. It is to be understood that although the microservice deployment management system 101 is illustrated in FIG. 2 as comprising a single entity, the microservice deployment management system 101 represents a collection of functionalities, which can be instantiated as a single or as multiple microservices, modules, components or other entities as desired. In some implementations, the different components of the microservice deployment management system 101 can reside on different computing devices 210 as desired.

It is to be understood that the components of the microservice deployment management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "backend computer system," "endpoint computing device," "client," "client computer," "server," "server computer" and "computing device" mean one or more computers configured and/or programmed to execute the described functionality. Additionally, program code to implement the functionalities of the microservice deployment management system 101 can be stored on computer-readable storage media. Any form of tangible computer-readable storage medium can be used in this context, such as magnetic, optical, flash and/or solid-state storage media, or any other type of media. As used herein, the term "computer-readable storage medium" does not mean an electrical signal separate from an underlying physical medium.

As illustrated in FIG. 2, the microservice deployment management system 101 can automatically modify the deployment configuration of microservices 107 executing in the cloud 105. As noted above, the cloud 105 may be instantiated within the context of any cloud provider 113, such as AWS, GCP, Azure, etc. Microservices 107 that are anticipated (e.g., by a software publisher, administrator, etc.) to be called at a frequency and/or to use resources below given predetermined thresholds 205 may be initially deployed as serverless services, e.g., using the serverless capabilities of the underlying cloud provider 113 such as AWS Lambda, Google Cloud Run, etc. On the other hand, microservices 107 that are anticipated to be called and/or to use resources above the corresponding threshold(s) 205 can be initially deployed on dedicated nodes 109, e.g., as a K8s service. It is to be understood that the thresholds 205 used for initial deployment selections are variable design parameters, which can be set and adjusted at any desired level of granularity.

Where multiple microservices 107 are deployed to execute in the cloud 105, a first subset of the microservices 107 can be deployed on containers 203 on dedicated nodes 109, for examples as Kubernetes services being managed by a Kubernetes orchestration system (not illustrated in FIG. 2). A second subset of the microservices 107 can be deployed on serverless configurations 117 in the cloud 105, using the serverless capabilities of the underlying cloud provider 113.

The microservice deployment management system 101 can monitor rates of invocation of microservices 107, for example API calls being made to invoke individual microservices 107 over given periods of time. The microservice deployment management system 101 can also monitor associated microservice runtime data, such as time from receipt of an API request to the return of a response, start-time to end-time, etc. For example, metering data 207 may be generated with respect to API calls being made to invoke individual microservices 107 and concerning their associated runtime data. In some implementations, the deployed microservices 107 may be configured, e.g., prior to initial deployment, to generate runtime metering 207 data concerning their invocations and associated runtime data.

The microservice deployment management system 101 can monitoring the metering data 207 generated by the microservices 107, for example via a metering service 209 which observes and consumes the metering data 207 associated with the various microservices 107 that are being monitored. The metering service 209 may itself be instantiated as a microservice 107, although in other implementations other architectures may be used.

The microservice deployment management system 101 may observe and assess the rate of the invocations of each microservice 107 being monitored, as well as the associated runtime data. If the rate of invocation exceeds an associated predetermined threshold 205, it can trigger a deployment configuration change to redeploy the microservice 107. As noted above, the thresholds 205 at which to redeploy microservices 107 are variable design parameters, and different values can be used in different scenarios, contexts and/or implementations as desired. In other words, responsive to a given monitored rate of invocation of a specific microservice 107 executing on a first deployment configuration exceeding a predetermined threshold 205, the microservice deployment management system 101 can automatically redeploy the specific microservice 107 to a second deployment configuration.

For example, the monitored data 207 may indicate that a specific microservice that is deployed serverless is to be redeployed to a dedicated node, e.g., because the microservice is being called too frequently or is using too many resources to be suitable for serverless deployment, as indicated by the metering data 207 and the corresponding threshold(s) 205. In this scenario, the microservice deployment management system 101 redeploys the microservice from its current deployment configuration that is in the form of a serverless deployment in the cloud 105, to a second deployment configuration that is in the form of a dedicated node configured to execute the microservice 107 in the cloud 105.

On the other hand, where the microservice deployment management system 101 determines that a microservice 107 running on a dedicated node (e.g., as K8s service) has a rate of calls and/or run-time characteristics suitable for being run serverless (as indicated by the metering data 207 and the corresponding threshold(s) 205), the microservice deployment management system 101 can trigger a deployment change to redeploy the microservice from its current dedicated node to a second deployment configuration in the form of a serverless deployment in the cloud 105. Such changes can be deployed, for example, as part of the next application update.

In different implementations, the microservice deployment management system 101 may take different actions to make individual microservices 107 deployable either on dedicated nodes 109 (e.g., as K8s services) or serverless. In some embodiments the microservice deployment management system 101 configures microservices 107 and their deployment environment such that a microservice 107 is agnostic to the specific cloud 113 provider and is thus deployable on all cloud platforms (e.g., AWS, GCP, Azure, etc.). To do so, the microservice deployment management system 101 may maintain a declarative deployment configuration that can be used to allocate resources for the microservices 107 when they deployed. The deployment configuration may be in the form of a .yml file (a YAML file). YAML is a human readable data serialization language commonly used to create configuration files with any programming language. In other implementations, the configuration may be in other formats as desired. The specific resources to allocate to specific microservices 107 being deployed according to specific configurations is a variable design parameter.

In order to be cloud provider agnostic, the microservices 107 are further configured to utilize a cloud abstraction layer to abstract the accessing of cloud resources across multiple cloud providers 113. In this context, the microservice deployment management system 101 may further maintain an infrastructure configuration (e.g., in the form of a YAML file), and use this to configure microservices 107 appropriately when deploying microservices 107 on various cloud providers 113. Individual microservices 107 may then use this configuration at runtime to access resources correctly.

In order to make a microservice 107 execute seamlessly either on a dedicated node 109 (e.g., as a K8s service) or serverless, the microservice deployment management system 101 may modify deployment to use the underlying cloud provider's functionality for invoking a serverless execution when entries are pushed onto a target (e.g., an Amazon Simple Queue Service (SQS) queue, GCP Pub/Sub, etc.). (SQS is a managed message queuing service provided by AWS; Pub/Sub is a messaging service for exchanging event data among services provided by GCP).

The microservice deployment management system 101 may use a startup script to determine whether a given microservice is executing in a serverless environment, and correctly invoke and/or set the appropriate entry point. For example, in the case of Python, on AWS the entry point can be invoked via AWS Lambda runtime, and on GCP, the HTTP handler can be registered to handle the push notifications from GCP. In one implementation, in either case the microservice is packaged as a Docker file. In other implementations, other package formats may be used as desired. Thus, the microservice deployment management system 101 can deploying an image of a microservice 107 to execute in a serverless environment, utilizing serverless support functionality of the underlying cloud provider 113.

In the context of deploying microservices 107 to run on dedicated nodes 109, microservices may be deployed as containers 203, for example by deploying a container image of the microservice 107 to run on a container 203. A container image of a microservice may be instantiated as, e.g., a Docker file.

In some implementations, the microservice deployment management system 101 monitors the underlying cloud provider 113 for changes concerning its serverless support functionality or other cloud-related services. In such instances, the microservice deployment management system 101 can adjust thresholds 205 at which microservices 107 are redeployed between serverless configurations 117 and dedicated nodes 109, in response to detecting changes made by the cloud provider 113. For example, the cloud provider 113 may change costs for providing support for serverless execution, or it may change the costs of providing specific types of cloud-based infrastructure. Based on changes in the cloud provider's relevant cost structure at any level of granularity, the microservice deployment management system 101 may adjust deployment thresholds 205 as desired. Thresholds 205 may also be adjusted in response to detecting a change to the resource provision for serverless support functionality made available by the cloud provider 113 (for example if the amount of time code is permitted to run serverless is increased or decreased, the number of instances that can be executed simultaneously is changed, etc.).

The microservice deployment management system 101 can also observe error conditions concerning executing microservices 107. For example, if the code of a specific microservice 107 has changed such that its runtime characteristics are incompatible with the resource limits of the serverless quotas of the cloud provider 113, the serverless execution of the microservice 107 could result in an error. If the time to execute the code has increased beyond that supported for serverless execution by the cloud provider 113, the execution of the service will be terminated at the time limit, and an error will be generated indicating that the service is being terminated for this reason. The microservice deployment management system 101 can detect this error, and trigger a configuration change to convert the deployment of the microservice from serverless execution to execution as, e.g., a K8s service on a dedicated node 109.

This is just an example of the type of error the microservice deployment management system 101 can detect, and in response trigger a corresponding redeployment. In general, the microservice deployment management system 101 can detect any error with the execution of a microservice 107 at any level of granularity, while the microservice 107 is executing in a serverless configuration 117. In response, the microservice 107 can be redeployed to execute on a dedicated node 109 in the cloud 105.

Figure 3:
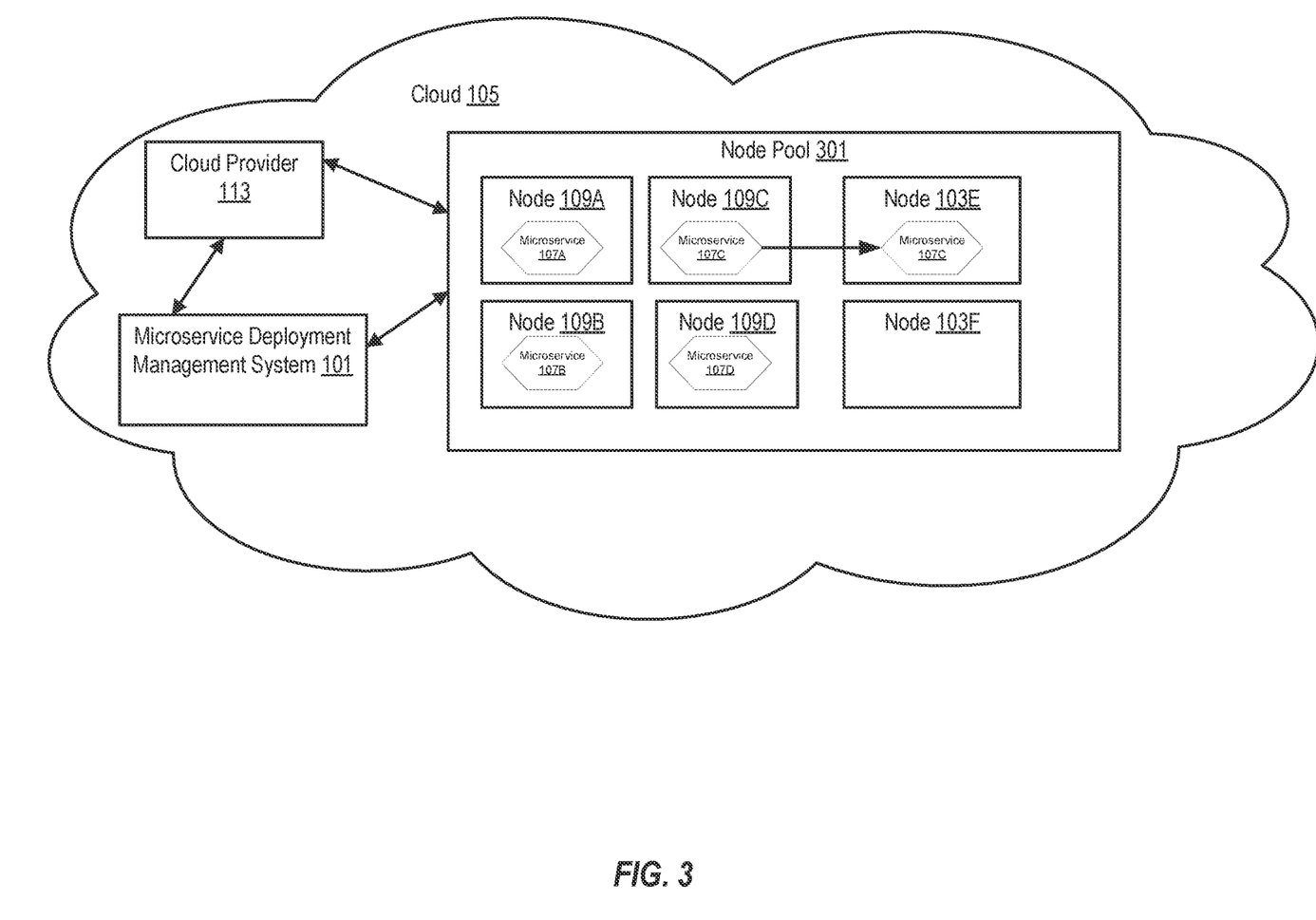
FIG. 3 illustrates another implementation of the operation of a microservice deployment management system.

As shown in FIG. 3, in one implementation, the microservice deployment management system 101 maintains a pool 301 of nodes 109 of varying resource capacities. In this context, the microservice deployment management system 101 can deploy microservices 107 between deployment configurations comprising two different nodes 109, each of which has a different resource configuration. In other words, if the monitoring of a microservice's metering data 207 relative to a given threshold 205 indicates that the microservice 107 should remain on a dedicated node 109, but one with a greater (or lesser) resource configuration based on the invocation frequency and/or resource consumption of the microservice 107, the microservice deployment management system 101 can redeploy the microservice 107 from a first dedicated node 109 having a first resource configuration to a second dedicated node having a second, different resource configuration.

Figure 4:
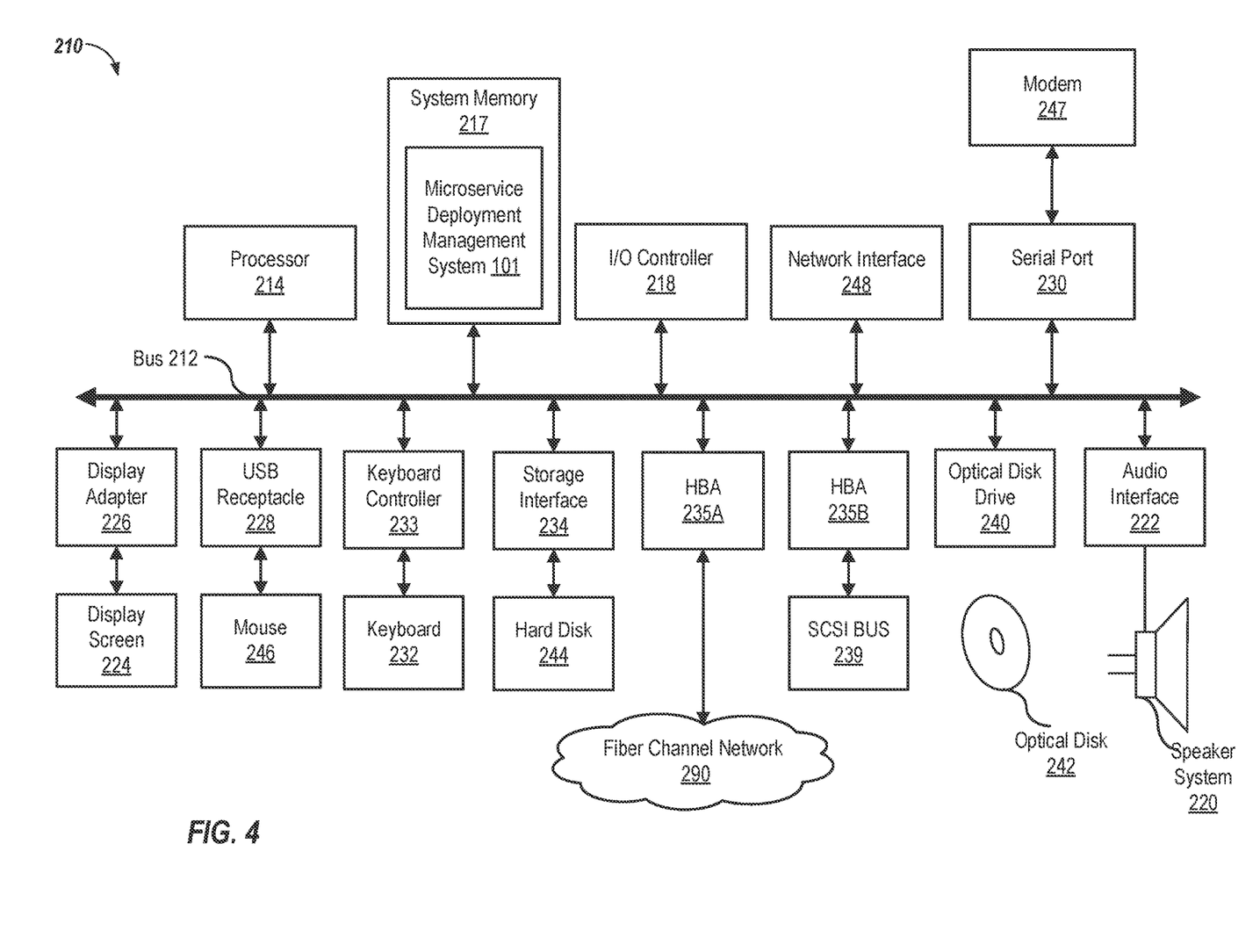
FIG. 4 illustrates a computer system suitable for implementing a microservice deployment management system, according to some implementations.

FIG. 4 is a block diagram of an example computer system 210 suitable for implementing a microservice deployment management system 101. Both endpoint computing devices 103 and backend computer systems can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an audio output device such as a speaker 220, a display adapter 226 communicatively coupled to a video output device such as a display screen 224, one or more interfaces such as Universal Serial Bus (USB) receptacles 228, serial ports 230, parallel ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fiber Channel (FC) network 290, an HBA interface card 235B configured to connect to a SCSI bus 239, an optical disk drive 240 configured to receive an optical disk 242, a mouse 246 (or other pointing device) coupled to the bus 212, e.g., via a USB receptacle 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 4 need not be present (e.g., smartphones and tablets typically do not have optical disk drives 240, external keyboards 232 or external pointing devices 246, although various external components can be coupled to mobile computing devices via, e.g., USB receptacles 228). The various components can be interconnected in different ways from that shown in FIG. 4.

The bus 212 allows data communication between the processor 214 and system memory 217, which, as noted above may include ROM and/or flash memory as well as RAM. The RAM is typically the main memory into which the operating system 250 and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 4, the microservice deployment management system 101 is illustrated as residing in system memory 217.

The storage interface 234 is coupled to one or more hard disks 244 (and/or other standard storage media). The hard disk(s) 244 may be a part of computer system 210 or may be physically separate and accessed through other interface systems.

The network interface 248 and/or modem 247 can be directly or indirectly communicatively coupled to a network 115 such as the internet. Such coupling can be wired or wireless.

As will be understood by those familiar with the art, the subject matter described herein may be embodied in other specific forms without departing from the spirit or integral characteristics thereof. Likewise, the particular naming and division of the portions, modules, agents, managers, components, functions, procedures, actions, layers, features, attributes, methodologies, data structures and other aspects are not mandatory or significant, and the entities used that implement the subject matter described herein may have different names, divisions and/or formats. The foregoing description, for purpose of explanation, has been described with reference to specific implementations. However, the illustrative discussions above are not intended to be exhaustive or limiting to the precise forms disclosed. Many modifications and variations are possible in view of the above teachings. The implementations were chosen and described in order to best explain relevant principles and their practical applications, to thereby enable others skilled in the art to best utilize various implementations with or without various modifications as may be suited to the particular use contemplated.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, bytes, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic device, that manipulates and transforms data represented as physical (electronic) quantities within the computer system's registers and memories into other data similarly represented as physical quantities within the computer system memories or registers or other such information storage, transmission or display devices.

Finally, the structure, algorithms, and/or interfaces presented herein are not inherently tied to any particular computer or other apparatus. Various general-purpose systems may be used with programs in accordance with the teachings herein, or it may prove convenient to construct more specialized apparatus to perform the method blocks. The structure for a variety of these systems will appear from the description above. In addition, the specification is not described with reference to any particular programming language. It will be appreciated that a variety of programming languages may be used to implement the teachings of the specification as described herein.

Accordingly, the disclosure is intended to be illustrative, but not limiting.

What is claimed is:
1. A computer implemented method for automatically modifying a deployment configuration of a microservice executing in a cloud, the method comprising:
monitoring a rate of invocation of the microservice executing on a first deployment configuration over a given period of time;

responsive to the monitored rate of invocation exceeding a predetermined threshold, automatically redeploying the microservice to a second deployment configuration;

wherein the first deployment configuration and the second deployment configuration are different;

monitoring an underlying cloud provider for changes concerning its serverless support functionality; and adjusting the predetermined threshold in response to detecting a change.

2. The method of claim 1 wherein:
the first deployment configuration further comprises a serverless deployment in the cloud; and
the second deployment configuration further comprises a dedicated node configured to execute the microservice in the cloud.

3. The method of claim 1 wherein:
the first deployment configuration further comprises a dedicated node configured to execute the microservice in the cloud; and
the second deployment configuration further comprises a serverless deployment in the cloud.

4. The method of claim 1 wherein:
the first deployment configuration further comprises a first dedicated node configured to execute the microservice in the cloud, the first dedicated node having a first resource configuration; and
the second deployment configuration further comprises a second dedicated node configured to execute the microservice in the cloud, the second dedicated node having a second resource configuration;
wherein the first resource configuration and the second resource configuration are different.

5. The method of claim 1 wherein monitoring a rate of invocation of the microservice executing on a first deployment configuration over a given period of time further comprises:
monitoring a rate of invocation of the microservice and monitoring runtime data concerning the microservice.

6. The method of claim 5 wherein monitoring runtime data concerning the microservice further comprises:
monitoring time from receipt of an Application Program Interface (API) request to return of a response to the API request.

7. The method of claim 5 wherein monitoring runtime data concerning the microservice further comprises:
monitoring start time to end time.

8. The method of claim 1 further comprising:
configuring the microservice, prior to deployment, to generate runtime metering data concerning at least its invocations; and
monitoring the metering data generated by the microservice.

9. The method of claim 8 further comprising:
configuring the microservice, prior to deployment, to generate runtime metering data concerning its invocations and associated runtime data.

10. The method of claim 1 wherein automatically redeploying the microservice further comprises:
deploying the microservice as a container.

11. The method of claim 1 wherein automatically redeploying the microservice further comprises:
deploying a container image of the microservice to run on a container.

12. The method of claim 11 wherein:
the container image of the microservice is instantiated as a Docker file.

13. The method of claim 1 wherein automatically redeploying the microservice further comprises:
deploying an image of the microservice to execute in a serverless environment, utilizing serverless support functionality of an underlying cloud provider.

14. The method of claim 13 wherein:
the image of the microservice is instantiated as a Docker file.

15. The method of claim 13 further comprising:
using the serverless support functionality of the underlying cloud provider when entries are pushed onto a target.

16. The method of claim 13 further comprising:
invoking an appropriate entry point for the microservice to execute in the serverless environment.

17. The method of claim 1 detecting a change further comprises:
detecting a change to cost of the serverless support functionality of the underlying cloud provider.

18. The method of claim 1 detecting a change further comprises:
detecting a change to resource provision of the serverless support functionality of the underlying cloud provider.

19. The method of claim 1 further comprises:
detecting an error with execution of the microservice while the microservice is executing in a serverless environment, utilizing serverless support functionality of an underlying cloud provider; and
redeploying the microservice to execute on a dedicated node in the cloud.

20. A computer implemented method for automatically managing deployments of a plurality microservices executing in a cloud, the method comprising:
monitoring rates of invocation of the plurality of microservices over a plurality of given periods of time;
responsive to a given monitored rate of invocation of a specific one of the plurality of microservices executing on a first deployment configuration exceeding a predetermined threshold, automatically redeploying the specific microservice to a second deployment configuration;
wherein the first deployment configuration and the second deployment configuration are different;
monitoring an underlying cloud provider for changes concerning its serverless support functionality; and
adjusting the predetermined threshold in response to detecting a change.

21. The method of claim 20 wherein:
a first subset of the microservices of the plurality are deployed to execute on containers on dedicated nodes in the cloud; and
a second subset of the microservices of the plurality are deployed in serverless deployments in the cloud.

22. The method of claim 21 wherein:
the microservices of the first subset are configured as Kubernetes services being managed by a Kubernetes orchestration system.

23. The method of claim 20 wherein:
the first deployment configuration further comprises a serverless deployment in the cloud; and
the second deployment configuration further comprises a dedicated node configured to execute the specific microservice in the cloud.

24. The method of claim 20 wherein:
the first deployment configuration further comprises a dedicated node configured to execute the specific microservice in the cloud; and the second deployment configuration further comprises a serverless deployment in the cloud.

25. At least one non-transitory computer-readable storage medium for automatically modifying a deployment configuration of a microservice executing in a cloud, the at least one non-transitory computer-readable storage medium storing computer executable instructions that, when loaded into computer memory and executed by at least one processor of a computing device, cause the computing device to perform the following steps:
- monitoring a rate of invocation of the microservice executing on a first deployment configuration over a given period of time;
- responsive to the monitored rate of invocation exceeding a predetermined threshold, automatically redeploying the microservice to a second deployment configuration;
- wherein the first deployment configuration and the second deployment configuration are different;
- monitoring an underlying cloud provider for changes concerning its serverless support functionality; and
- adjusting the predetermined threshold in response to detecting a change.

26. The least one non-transitory computer-readable storage medium of claim 25 wherein:
- the first deployment configuration further comprises a serverless deployment in the cloud; and
- the second deployment configuration further comprises a dedicated node configured to execute the microservice in the cloud.

* * * * *